(12) United States Patent
Grundfest et al.

(10) Patent No.: US 11,565,420 B2
(45) Date of Patent: Jan. 31, 2023

(54) TELEOPERATION IN A SMART CONTAINER YARD

(71) Applicant: Phantom Auto Inc., Mountain View, CA (US)

(72) Inventors: Joe Grundfest, Portola Valley, CA (US); Shay Magzimof, Palo Alto, CA (US); David Parunakian, Moscow (RU); Michael Kris, Campbell, CA (US); Elrom Silvera, Kfar Saba (IL)

(73) Assignee: Phantom Auto Inc., Mountain View, CA (US)

( * ) Notice: Subject to any disclaimer, the term of this patent is extended or adjusted under 35 U.S.C. 154(b) by 431 days.

(21) Appl. No.: 16/789,256

(22) Filed: Feb. 12, 2020

(65) Prior Publication Data

US 2020/0254619 A1     Aug. 13, 2020

Related U.S. Application Data

(60) Provisional application No. 62/805,240, filed on Feb. 13, 2019.

(51) Int. Cl.
| | |
|---|---|
| *B25J 9/16* | (2006.01) |
| *G05D 1/00* | (2006.01) |
| *B64C 39/02* | (2006.01) |
| *G05D 1/10* | (2006.01) |
| *G06V 20/20* | (2022.01) |

(52) U.S. Cl.
CPC .......... *B25J 9/1689* (2013.01); *B25J 9/1666* (2013.01); *B64C 39/024* (2013.01); *G05D 1/0038* (2013.01); *G05D 1/104* (2013.01); *G06V 20/20* (2022.01); *B64C 2201/122* (2013.01)

(58) Field of Classification Search
CPC ....... B25J 9/1689; B25J 9/1666; G06V 20/20; B64C 39/024; B64C 2201/122; G05D 1/0038; G05D 1/104
See application file for complete search history.

(56) References Cited

U.S. PATENT DOCUMENTS

| | | | | |
|---|---|---|---|---|
| 6,108,031 | A * | 8/2000 | King | H04N 13/194 348/E13.071 |
| 7,484,663 | B2 * | 2/2009 | Olsen, III | G06Q 10/08 235/375 |

(Continued)

OTHER PUBLICATIONS

Anderson et al., Constraint-Based Planning and Control for Safe, Semi-Autonomous Operation of Vehicles, Jun. 3-7, 2012 (Year: 2012).*

(Continued)

*Primary Examiner* — Dale W Hilgendorf
*Assistant Examiner* — Hana Lee
(74) *Attorney, Agent, or Firm* — Fenwick & West LLP (57) ABSTRACT

A smart container yard includes systems for intelligently controlling operations of vehicles in the container yard using teleoperation and/or autonomous operations. A remote support server controls remote support sessions associated with vehicles in the container yard to provide teleoperation support for loading and unloading operations. Aerial drones may be utilized to maintain positions above a teleoperated vehicle and act as signal re-transmitters. An augmented reality view may be provided at a teleoperator workstation to enable a teleoperator to control vehicle operations in the smart container yard.

20 Claims, 6 Drawing Sheets

(56) References Cited

U.S. PATENT DOCUMENTS

| | | | |
|---|---|---|---|
| 9,786,187 B1* | 10/2017 | Bar-Zeev | G08G 5/0034 |
| 10,386,836 B2 | 8/2019 | Lockwood et al. | |
| 10,392,190 B1* | 8/2019 | Theobald | B25J 9/161 |
| 11,262,747 B2* | 3/2022 | Hoofard | G16Y 40/60 |
| 2016/0371982 A1* | 12/2016 | Arndt | G08G 1/096844 |
| 2017/0160735 A1* | 6/2017 | Mikan | G08G 1/205 |
| 2017/0269607 A1* | 9/2017 | Fulop | B25J 13/025 |
| 2017/0313230 A1* | 11/2017 | Valtanen | B60P 1/045 |
| 2018/0319594 A1* | 11/2018 | Blevins | B66F 9/082 |
| 2019/0011910 A1 | 1/2019 | Lockwood et al. | |
| 2019/0163176 A1* | 5/2019 | Wang | G05D 1/0027 |
| 2019/0179305 A1* | 6/2019 | Magzimof | G05D 1/0038 |
| 2020/0104790 A1* | 4/2020 | Chung | G06F 16/29 |
| 2020/0249668 A1* | 8/2020 | Woodruff, III | H02J 13/00022 |

OTHER PUBLICATIONS

Carlo, H.J. et al., "Storage yard operations in container terminals: Literature overview, trends, and research directions," European Journal of Operational Research, vol. 235, Nov. 11, 2013, pp. 412-430.

Clarke, M.P., "Virtual logistics: An introduction and overview of the concepts," International Journal of Physical Distribution & Logistics Management, vol. 28 Iss 7, May 1998, pp. 486-507.

Conductix-Wampfler, "Energy & Data Transmission Systems for Container Handling Equipment," 2012, pp. 1-20.

Dhingra, V. et al., "Solving semi-open queuing networks with time-varying arrivals: An application in container terminal landside operations," European Journal of Operational Research, vol. 267, Dec. 19, 2017, pp. 855-876.

Gharehgozli, A. H., "Developing New Methods for Efficient Container Stacking Operations," Erasmus University Rotterdam, Nov. 2012, pp. 1-156.

Japan International Cooperation Agency (JICA), "Master Plan Study on Port Development and Logistics in Greater Jakarta Metropolitan Area," Dec. 2011, pp. 42-90.

Kauhanen, J. T., "Study on Customer Perceived Value of Container Loading Equipment," Lappeenranta University of Technology Master's Thesis, 2015, pp. 1-89.

Kim, K.H. et al., "An optimal layout of container yards," OR Spectrum, 30(4), Nov. 24, 2007, pp. 675-695.

Kozan, E. et al., "Alternative algorithms for the optimization of a simulation model of a multimodal container terminal," Journal of the Operational Research Society, vol. 58, Aug. 9, 2006, pp. 1203-1213.

Lee, B.K. et al., "Optimizing the yard layout in container terminals," OR Spectrum, vol. 35, Jun. 7, 2012, pp. 363-398.

Lee, Y. et al., "An optimization model for the container pre-marshalling problem," Computers & Operations Research, vol. 34, Feb. 24, 2006, pp. 3295-3313.

Li, W. et al., "Planning and Scheduling for Maritime Container Yards," ISBN 978-3-319-17024-4, 2015, pp. 1-116.

Liu, C-I. et al., "Automated guided vehicle system for two container yard layouts," Transportation Research Part C, vol. 12, Oct. 2004, pp. 349-368.

Liu, Y et al., "A Heuristic Algorithm Based on DBR and MAS for Solving Container Loading Problem," 2006 IEEE International Conference on Service Operations and Logistics, and Informatics, Jun. 2006, pp. 476-481.

Ng, W.C. et al., "Yard crane scheduling in port container terminals," Applied Mathematical Modelling, vol. 29, Mar. 2005, pp. 263-276.

Ospina, C.E. et al., "Design of Container Yard at Port of Balboa," 12th Triannual International Conference on Ports, Apr. 2010, pp. 1-10.

Petering, M. et al., "Effect of block length and yard crane deployment systems on overall performance at a seaport container transshipment terminal," Computers & Operations Research, vol. 36, Apr. 29, 2008, pp. 1711-1725.

Petering, M., "Effect of block width and storage yard layout on marine container terminal performance," Transportation Research Part E, vol. 45, Jul. 2009, pp. 591-610.

Stahlbock, R. et al., "Operations research at container terminals: a literature update," OR Spectrum, vol. 30, Oct. 10, 2007, pp. 1-52.

Tran, T. et al., "Power Demand and Energy Usage of Container Crane—Comparison between AC and DC Drives," 2008 43rd International Universities Power Engineering Conference, Sep. 2008, pp. 1-5.

Vis, I. et al., "Transshipment of containers at a container terminal: An overview," European Journal of Operational Research, vol. 147, May 2003, pp. 1-16.

Zhang, C. et al., "Dynamic crane deployment in container storage yards," Transportation Research Part B, vol. 36, Jul. 2002, pp. 537-555.

* cited by examiner

TELEOPERATION IN A SMART CONTAINER YARD

CROSS-REFERENCE TO RELATED APPLICATIONS

This application claims the benefit of U.S. Provisional Patent Application No. 62/805,240 filed on Feb. 13, 2019, the contents of which are incorporated by reference herein.

BACKGROUND

Technical Field

The disclosed embodiments relate generally to the field of remote teleoperation and more specifically to intelligent container yard systems for acquiring, structuring, and disseminating information describing the state of a shipping container yard with the purpose of enabling efficient teleoperation of cargo and utility vehicles.

Description of the Related Art

The ongoing explosion of computing and network technologies has a profound impact on all fields of human endeavor. Among other effects, diminishing sizes and power requirements of computers as well as advances in cellular communications and rapidly falling costs have created vast opportunities for optimizing transportation and the logistics industry. While the goal of building fully autonomous fleets of passenger vehicles and taxicabs occupies public attention, safety considerations render it desirable for vehicles to also have teleoperation capacity to be controlled by a remote driver in case the machine intelligence operating the autonomous vehicle is incapable of proceeding safely.

Teleoperation may also be used with industrial applications, reducing the potential for human injuries and improving the total efficiency of industrial vehicle operators by merging teleoperation controls with custom information systems and augmented reality displays.

SUMMARY OF THE EMBODIMENTS

A method, non-transitory computer-readable storage medium, and system manages a teleoperated vehicle in a container yard. A remote support server receives a remote support request associated with a truck at an entry point of the container yard. In response to receiving the remote support request, an operational plan is obtained for the truck from a container yard information system and a teleoperation session for the truck is initiated. During the teleoperation session, a telemetry data stream is received that represents environmental conditions in a vicinity of the truck to enable teleoperation of the truck in accordance with the operational plan. Based on the operational plan and the telemetry data stream, the remote support server generates teleoperation control signals for controlling the truck to navigate to a location of a container stack in the container yard in accordance with the operational plan. The remote support server detects completion of a loading or unloading operation of the truck in association with the container stack, and responsive to detecting the completion, generates based on the operational plan and the telemetry data stream, teleoperation control signals for controlling the truck to navigate to an exit point of the container yard. Responsive to detecting the truck reaching the exit point, the remote support server terminates the teleoperation session.

In an embodiment, the remote support server generates the teleoperator control signals further based in part on sensor data received from distributed sensor arrays in the container yard.

In an embodiment, the remote support server further identifies a personal electronic device of a driver associated with the truck, and transmits to the personal electronic device of the driver during the teleoperation session, directions to the exit point of the container yard.

In an embodiment, initiating the teleoperation session comprises transmitting a deployment signal to deploy an aerial vehicle to maintain an overhead position relative to the truck to enable the aerial vehicle to operate as a wireless signal re-transmitter for communications between the remote support server and the truck when carrying out the operational plan, transmitting the teleoperation control signals to the aerial vehicle, and receiving the telemetry data stream from the aerial vehicle.

The remote support server may furthermore receive an auxiliary telemetry data stream comprising telemetry data captured by sensors of the aerial vehicle, and generate the teleoperation control signals for controlling the truck based at least in part on the auxiliary telemetry data stream from the aerial vehicle.

In an embodiment, initiating the teleoperation session comprises transmitting a deployment signal to deploy a plurality of aerial vehicles to fly in a formation at a position relative to the truck to enable the plurality of aerial vehicles to operate as a chain of wireless signal re-transmitters for communications between the remote support server and the truck when carrying out the operational plan, transmitting the teleoperation control via the chain of aerial vehicles, and receiving the telemetry data stream comprises receiving the telemetry data stream via the chain of aerial vehicles.

In an embodiment, initiating the teleoperation session comprises transmitting a deployment signal to deploy a first aerial vehicle to maintain an overhead position relative to the truck to enable the first aerial vehicle to operate as a wireless signal re-transmitter for communications between the remote support server and the truck when carrying out a first phase of the operational plan, detecting a power level of the first aerial vehicle, and responsive to the power level dropping below a threshold power level when carrying out the operational plan, sending a deployment signal to deploy a replacement aerial vehicle to maintain the overhead position relative to the truck to enable the replacement aerial vehicle to operate as the wireless signal re-transmitter for communications between the remote support server and the truck when carrying out a second phase of the operational plan.

In an embodiment, obtaining the operational plan comprises generating a container yard space state representing physical objects in the container yard, and generating the operational plan based on the container yard space state to include navigation paths that avoid the physical objects. In an embodiment, generating the operational plan comprises identifying path homotopies based on a triangulation of paths between the physical objects.

In an embodiment, obtaining the operational plan comprises determining an identifier of the truck at the entry point and performing a lookup of the identifier in a vehicle database to obtain the operational plan for the truck.

In an embodiment, a teleoperator workstation generates an augmented reality view of a perspective of the truck based on the telemetry data, outputs the augmented reality view to a display headset of an operator, and obtains the teleoperation control signals based on inputs received from the operator using one or more input controllers. The augmented reality view may include a representation of information from the container yard information system describing physical objects in a vicinity of the truck.

In an embodiment, the remote support server receives a signal that a container is ready to be loaded or unloaded, initiates a remote support session for a forklift having an extensible antenna to allow wireless connectivity when the forklift enters a container, and teleoperates the forklift to perform the loading or unloading of the container. The forklift may comprise a detachable communications device that can be automatically mounted at the entrance to the container for transmitting the teleoperation control signals and receiving the telemetry data stream.

In a further embodiment, the remote support server receives a signal that a container is ready to be loaded or unloaded, initiates a remote support session for a yard truck responsive to the signal, and teleoperates the yard truck to perform the loading or unloading of the container.

DETAILED DESCRIPTION

Overview

Maritime container shipping was introduced as late as the 1950s, and has since become an important mode of cargo transportation. Its rapid growth has been promoted by standardization of shipping container sizes and development of chassis for hauling containers with trailer trucks and railroad systems. To allow faster loading and discharge times for large ocean-going containerships, multiple ports and cargo terminals around the world have constructed container yards where loaded and empty containers are stacked while awaiting further handling. While in some jurisdictions, the maximum stack size is limited to three containers, in many others these limits are relaxed to promote better efficiency of coastline usage and to drive down costs for the end customers. The layout of a container yard may either be parallel or perpendicular to the quay; other layout types are rare. Academic research has been focused on optimizing container yard utilization by using advanced mathematical models and engineering techniques. The present embodiments describe an information system that reduces operation costs of a container yard by creating an environment suitable for teleoperation of cargo trucks and utility vehicles.

In an embodiment, a smart container yard information system sets up dedicated WiFi hotspots with or without roaming and handover capabilities, mesh networking environment, dedicated cellular eNBs, repeaters for public cellular eNBs, coaxial antenna cables or other implements to provide wireless communications capabilities to sensor arrays, structures and vehicles servicing a container yard. Wireless communication capabilities may be used for low-latency streaming of video feeds, telemetry, operator commands or other data streams. A smart container yard information system also maintains a representation of the current state of a container yard with the degree of precision and completeness desirable for safe operation utilizing a distributed array of stereo optical and infrared cameras, ranging devices such as sonars, LIDARs, radars, BLE beacons or other implements as well as computational systems for processing sensor measurements. A container yard space state may be represented as a cuboid populated by convex polygonal shapes enveloping physical objects in the container yard. Vehicles, structures and other objects may be identified by means such as Bluetooth low energy (BLE) beacons, radio frequency identification (RFID) tags, near field communication (NFC) tags, QR codes or other machine-readable decals, computer vision algorithms applied to human-readable IDs such as license plates or vehicle numbers.

In an embodiment, a system computes optimal or quasi-optimal intra-yard logistical solutions satisfying desired safety criteria and disseminates data streams necessary to enable autonomous function or teleoperation of utility vehicles in the yard. A system may comprise distributed sensor arrays, communication systems, and computer simulation farms. Wireless signal coverage of the container yard area or additional sensor data feeds to human or machine intelligence operators are provided by autonomous or teleoperated unmanned aerial vehicles acting as mobile retransmitters or observation posts.

In one embodiment, remote human operators are provided with augmented reality displays populated with auxiliary information to coordinate and optimize utility vehicle operations in order to allow human agents to avoid hazardous areas of a container yard. Remote support sessions may be executed for trucks arriving at the entry gate for the whole duration of the visit, and truck drivers are guided or transported to the appropriate exit gate in a safe manner. The teleoperation system for container yard utility vehicles may furthermore be used to keep human operators away from hazardous areas of a container yard while providing them with augmented reality displays populated with auxiliary information to coordinate and optimize utility vehicle operations.

In another embodiment, path homotopies in a dynamical 3D environment of a container yard are identified using methods such as constrained Delaunay triangulation, and coordinated path planning for transfer cranes, ground and aerial vehicles in the container yard is executed. Path homotopies may be refined to propose safe path solutions, which may subsequently be provided to human operators using methods such as augmented reality displays, or to machine intelligence agents via appropriate channels and protocols.

Figure 1:
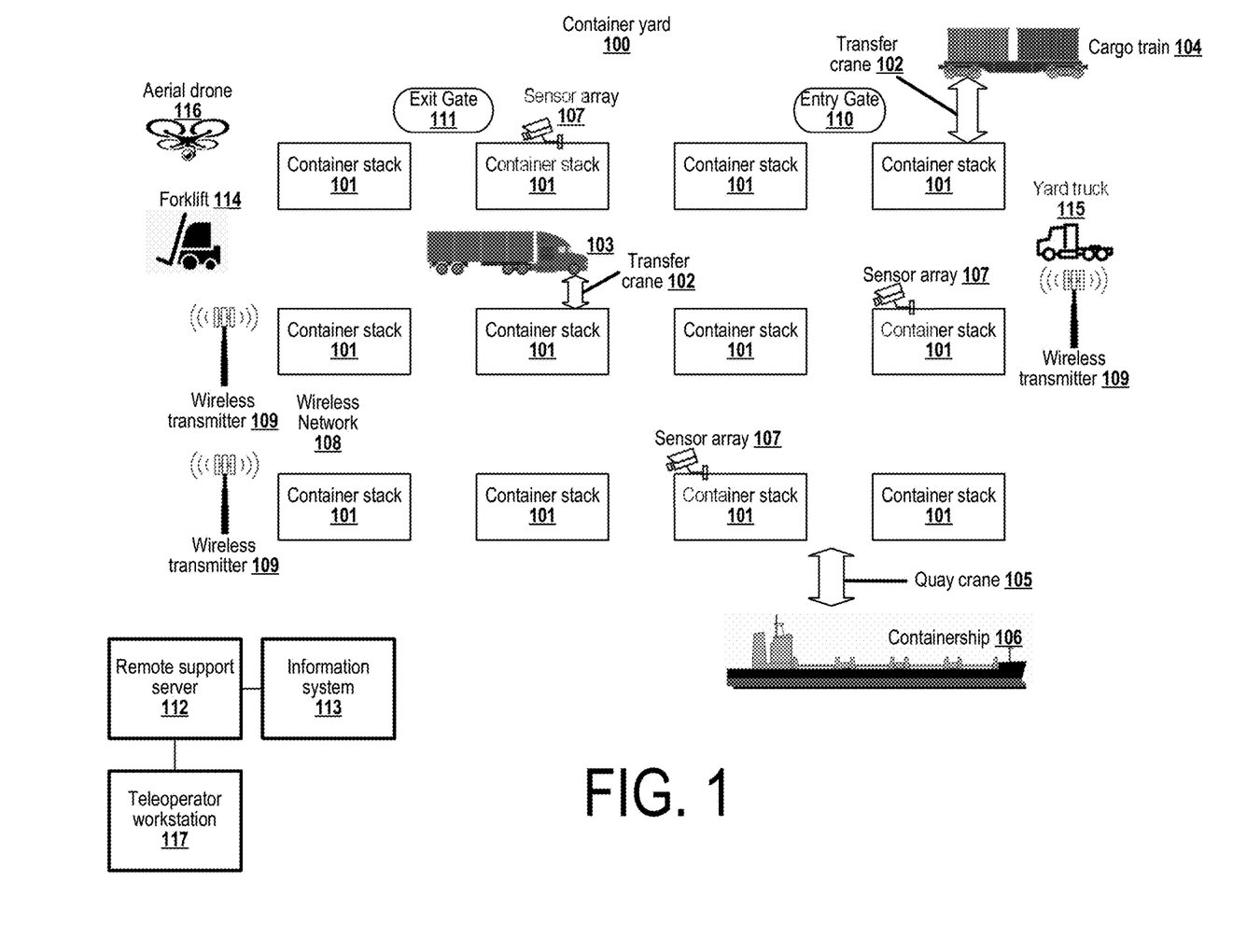
FIG. 1 is a diagram illustrating an example layout of a smart container yard.

FIG. 1 is a diagram of a smart container yard 100 layout including a plurality of blocks of container stacks 101, transfer cranes 102 for transporting containers between a container stack 101 and a carrier truck 103 or a container stack 101 and a cargo train 104, a carrier truck 103, a cargo train 104, a quay crane 105, a containership 106, a plurality of sensor arrays 107, one or more networks 108 comprising a plurality of wireless signal transmitters 109, a truck entry gate 110, a truck exit gate 111, a remote support server 112, an information system 113, a plurality of forklifts 114, a plurality of yard trucks 115, a plurality of aerial drones 116 and a plurality of teleoperator workstations 117. In alternative embodiments, the smart container yard 100 may include different or additional components.

Embodiments of the remote support server 112, information system 113, teleoperator workstation 117, and smart systems of the carrier truck 103, forklift 114, yard truck 115, aerial drone 116, or other systems described herein may be implemented using one or more processors and a non-transitory computer-readable storage medium that stores instructions executable by the one or more processors to perform the functions attributed to various systems and devices described herein. Various components of the smart container yard 100 may be implemented on local computing systems, on network-based cloud servers, or a combination thereof.

In an example container yard operation, a carrier truck 103 enters a container yard 100 via an entry gate 110 and travels to a destination container stack 101. A transfer crane 102 unloads the carrier truck 103 by placing one or more containers from the carrier truck 103 onto a container stack 101. The carrier truck 103 subsequently travels to a source container stack 101, where a transfer crane 102 loads the carrier truck 103 by placing one or more containers from a container stack 101 onto the carrier truck 103. The carrier truck 103 subsequently exits the container yard 100 via an exit gate 111. In other instances, a carrier truck 103 may perform only loading (without necessarily unloading) or only unloading (without necessarily loading).

In another example container yard operation, a cargo train 104 comprising one or more flatcars or well cars suitable for transporting intermodal containers enters the container yard 100. One or more transfer cranes 102 load or unload the cargo train 104 in accordance with a current operational plan, to transport containers between the cargo train 104 and container stacks 101.

In yet another example of a container yard operation, a containership 106 is moored at a berth of the container yard 100. One or more quay cranes 105 load or unload the containership 106 in accordance with a current operational plan to transport containers between the containership 106 and container stacks 101.

In yet another example of a container yard operation, containers are transported between container stacks 101 using forklifts 114 and/or yard trucks 115.

The carrier truck 103 comprises a trailer truck or a semi-trailer truck equipped for transporting intermodal containers. The carrier truck 103 may comprise a tractor unit and a trailer, or alternatively the carrier truck 103 may comprise a semi-tractor unit and a semi-trailer. The carrier truck 103 further comprises an intelligent transport system (ITS) that connects to one or more networks 108 and communicates with one or more entities via the one or more wireless signal transmitters 109 to enable the carrier truck 103 to obtain information useful to safe navigation of a container yard environment 100.

In an embodiment, the carrier truck 103 may comprise a non-autonomous vehicle that relies on control inputs from a driver in the carrier truck 103 or on control inputs from a teleoperator provided by a remote support server 112. In the case of teleoperation, the carrier truck 103 wirelessly receives control inputs via the one or more networks 108 that control various components of the drive system such as the steering system, acceleration, braking, etc.

Alternatively, the carrier truck 103 may comprise an autonomous or semi-autonomous vehicle that includes an autonomous driving system that automatically controls navigation responsive to sensed environment conditions.

The carrier truck 103 may also optionally comprise various sensors such as optical or infrared cameras, ranging devices such as LIDAR, sonar or radar units, or other sensor types allowing real-time acquisition of data on the smart container yard 100, components and occupants of the truck 103, and streaming the acquired data over one or more networks 108 to a remote support server 112. The data acquired by sensors integrated with a carrier truck 103 may augment and expand the data acquired by the standalone sensor arrays 107 set up in the smart container yard 100.

A smart container yard information system 113 maintains a representation of the current state of a smart container yard 100 with a degree of precision and completeness that enables safe operation of the vehicles and equipment in the container yard 100. The informational system 113 may furthermore maintain, or receive in real-time, operational signals representative of an operational plan for carrying out operations in the container yard 100. For example, the operational plan may determine an identifier a carrier truck 103 at the entry gate 110 (or other vehicle in the container yard 100) and perform a lookup of the identifier in a vehicle database to obtain the operational plan. The operational plan may include, for example, a schedule for loading and unloading containers, may specify which vehicles and cranes are involved with different loading or unloading operations, and may specify particular routes taken by various vehicles to carry out the operational plan. The information system 113 may further receive data acquired by the sensor arrays 107 and/or sensors on the trucks 103 or other vehicles or equipment, and process the data by a computational server of the information system 113 to generate or modify operations of the operational plan for the container yard 100.

In an embodiment, the information system 113 may use manual modelling performed according to technical specifications, analysis of measurements acquired by sensor arrays 107 or imported vendor datasets, or other sources to produce physical models of ground vehicles (such as forklifts 114 and yard trucks 115) and aerial drones 116 servicing the container yard 100 as well as of visiting trailer trucks 103.

In an embodiment, the information system 113 may use physical simulation software and available physical models to determine the kinematics of objects populating the smart container yard environment 100 to predict future states of the environment 100 depending on current values of generalized coordinates of objects such as vehicles, cranes or containers, as well as their derivatives of first and higher orders.

Kinematics of service vehicles such as yard trucks 115 or forklifts 114 are substantially affected by the loadout and dynamical properties of containers they carry. Among the characteristics affected are the total weight of a vehicle or a trailer, position of the center of mass, road friction coefficient and deformation. Depending on the mass of a container, certain maneuvers may be safe or hazardous to execute; this information therefore may be used by both autonomous agents and human operators to choose vehicle paths, velocities and accelerations and avoid maneuvers that may lead to jackknifing, collisions or other accident scenarios. To compute the dynamics of a container, it is desirable to establish container mass and its distribution. Many various methods may be envisaged to achieve this goal.

In an embodiment, the information system 113 may obtain a container identifier from a sensor array 107 or a service vehicle 114, 115, obtain a container manifest from a shipper or a third-party source, retrieve information corresponding to the identifier in the manifest, and use the retrieved information to determine dynamical properties of the container such as the center of mass. Examples of container identifiers include information recorded in RFID tags, machine-readable tags such as barcodes or QR codes printed or otherwise displayed on either panel of the container, or human-readable marks and inscriptions on the container parsed using computer vision methods. The information system 113 may select multiple candidate container identifiers for subsequent processing if there are two or more identifiers matching the observations by sensor arrays 107 or service vehicles 114, 115 with a sufficient degree of confidence.

A container may enter a container yard 100 mainly either via a container ship 106, or via a trailer carrier truck 103. Either of these entry methods may allow the container yard information system 113 to acquire additional information on the origin of the container and its loadout, supplementing or replacing information acquired from the container identifier that may or may not be available.

In an embodiment, the information system 113 may apply computer vision methods to read a license plate of the carrier truck 103 carrying a container and subsequently query a database of vehicles allowed entry to the container yard 100 for the license plate number parsed in order to perform container identification.

In an embodiment, the information system 113 may use computer vision methods to determine the make and the model of a carrier truck 103 to use as an additional source of data to discriminate between multiple candidate trucks. For example, this approach may be used in a case when multiple license plates match the available image with insufficient degree of confidence difference between them.

In an embodiment, the information system 113 may query a database of trucks 103 registered to visit the container yard 100 within a reasonable time frame such as 24 hours for the candidate license numbers to select matching candidates.

In an embodiment, the information system 113 may query a database of containership 106 arrivals and departures for associations with trucks 103 identified by candidate license plates. For example, this approach may allow selection of one license plate out of multiple candidates if there is a single carrier truck 103 with a license plate number matching a recognized one with a sufficient degree of confidence that is expected to pick up cargo from containerships 106 currently moored or arriving within the next few hours.

In an embodiment, the information system 113 may query a database of a containership 106 via a designated interface for the manifest of a previously identified container. Alternatively, the container may also be identified by its position on the containership 106 deck.

In an embodiment, the information system 113 may use the information obtained as a result of container identification to determine the shipper and obtain container dynamics data, power requirements for refrigerated containers, maximum timespan a particular container is allowed to remain unpowered or other data useful for constraining transfer solutions.

In some cases, a container that is scheduled to be transferred to a carrier truck 103 to be located beneath a stack 101 of other containers that are scheduled to be handled later. In one embodiment, the information system 113 may synchronize container extraction and pre-marshalling from a stack 101 in the container yard 100 or on a containership 106 with the estimated time of arrival of a specific carrier truck 103 it is associated with to optimize and accelerate container handling. For instance, the information system 113 may associate a carrier truck 103 comprising in part a global navigational satellite system receiver and wireless communication capabilities with an asset tracking system of the container yard 100. Responsive to scheduling of container pickup the information system 113 may start polling for the location of a carrier truck 103. Alternatively, responsive to scheduling of container pickup the onboard software of a carrier truck 103 may actively transmit location updates to the information system 113. The information system 113 may subsequently combine location information with routing and traffic data acquired from third parties to estimate a truck's 103 arrival time $t_{ak}$ (where k is the identifier of a carrier truck 103). The information system 113 may combine arrival times for all trucks 103 currently reported as being in transit to the container yard 100 for pickup and their associated container identifiers into a list $T_a$. The information system 113 may further use a resource planning method such as a genetic algorithm or heuristic search to compute a container marshalling solution given the number and position of available cranes and the estimated time to execute container pre-marshalling in a particular sequence as a constraint. The information system 113 records the result of the resource planning algorithm execution into a list $T_m$ where each element $t_{mk}$ corresponds to the estimated time of containers associated with each carrier truck 103 in transit being ready for pickup. The information system 113 may compute the cost function as the root mean square of a list $\Delta T = T_m - T_k$ or otherwise. The information system 113 may subsequently enact a solution possessing a minimal cost function value. The information system 113 may recompute the solution regularly or responsive to a request in order to accommodate new information such as a carrier truck 103 being delayed due to a traffic jam or a new container pickup request being registered.

In a further embodiment, the information system 113 may compute the time necessary to reshuffle a container stack 101 accounting for the masses of the containers involved to limit accelerations and higher order derivatives of container generalized coordinates to safe values. Particularly the information system 113 may run a mechanical model to compute the maximum acceleration that may be applied to each container by a transfer crane 102 servicing its stack 101 depending on the mass of the container as declared in the cargo manifest and the engine power of the transfer crane 102, and supply the obtained results to the optimal pre-marshalling solution search program.

In a further embodiment, the information system 113 may compute the time to reshuffle a container stack 101 accounting for possible delays and costs incurred by other ground vehicles 103, 114, 115 and air drones 116 in the container yard 100 while waiting, staying clear of, or accommodating for the paths of the containers being transferred. For instance, an aerial drone 116 accompanying a yard truck 115 may be forced to hold its position while a transfer crane 102 relocates a container across its planned path, delaying the delivery of a container onboard a yard truck 115 while reducing the transfer speed of the container by the transfer crane 102 would have allowed the aerial drone 116 and the yard truck 115 to successfully pass the hazardous area before the transfer crane 112 would block their path with the container being transferred.

In a further embodiment, the information system 113 may translate the pre-marshalling solution objective function from time to a unit such as dollar value that can be used as a common base for additive combination with cost functions computed for other components of the container yard 100 and associated agents. An example cost function that would accurately describe the above-mentioned scenario may be represented as follows:

$$F = \sqrt{\frac{1}{K}\sum_{k=1}^{K} p_{tk}c_{tk}(t_{ak} - t_{mk})^2} + \sum_{i=1}^{I} c_{di}P_{ti}(\max(D_{di}^2 - d_t^2, 0))$$

Here $c_{tk}$ and $c_{di}$ are the normalization coefficients used to translate cost function components corresponding to non-optimal container pickup schedule and desynchronization of teleoperated trucks 103 with their associated aerial drones 116 to a common base; $p_{tk}$ and $p_{di}$ are optional custom priority coefficients assigned to each carrier truck 103 for a fee paid by vehicle operators, $t_{ak}$ is the estimated arrival time for each carrier truck 103 being tracked, $t_{mk}$ is the estimated container readiness time for each container associated with each carrier truck 103 being tracked, $D_{di}$ is the maximum distance in each pair of aerial drone 116 and a carrier truck 103 traversing the container yard, and $d_t$ is the threshold distance below which no penalties are incurred by candidate solutions.

Teleoperation

Modern motor cars and industrial vehicles are commonly equipped with a drive-by-wire system which allows the decoupling of driver inputs from actuators, as opposed to controlling them directly via a hydraulic amplification system. Subsequently, such vehicles do not require the physical presence of the driver in the vehicle, as the drive-by-wire system may be linked to an onboard computer with a networking interface which is used to receive commands from a remote operator and translate them to a format supported by the drive-by-wire system.

The remote support server 112 communicates with one or more vehicles (e.g., carrier truck 103, yard truck 115, forklift 114, aerial drone 116) to provide teleoperation or other support services. In an embodiment, upon initiating a remote support session with a vehicle, a video stream capturing a vehicle environment is provided to the remote support server 112 and presented at a teleoperation workstation 117. Furthermore, other sensor data or video streams may be provided from the vehicle or external sensor arrays 107. In this embodiment, a human teleoperator at the teleoperation workstation 117 may view the video stream on a display and provide control inputs via a control input device. The remote support server 112 may present the video in real-time and provide real-time teleoperation control signals to control the vehicle to enable the teleoperator to remotely drive the vehicle.

In another embodiment, the remote support server 112 may comprise an artificial intelligence agent that does not necessarily require a teleoperator workstation 117 with a display or physical controls for providing human input. Here, the remote support server 112 may provide control instructions to the vehicle directly based on the processing of a real-time video feed and other sensor data without necessarily utilizing any human input. In alternative embodiments, the remote support server 112 may comprise a semi-robotic agent that interacts with a teleoperator workstation 117 in a similar manner as a human teleoperator.

The teleoperator workstation 117, if present, may be coupled to the remote support server 112 via a local area network connection, a direct wired connection, or via a remote connection. A teleoperator workstation 117 may include a display to enable a human teleoperator to view real-time video of the vehicle environment and controls for enabling a human teleoperator to control the vehicle. In an embodiment, the video may include at least a front view that mimics or approximates the view seen by a driver within the vehicle. Optionally, the video may include additional views, such as a rear view video, side view videos, or other views that may mimic the views seen by a driver in mirrors of a traditional vehicle or may include other views not necessarily available to a driver of a traditional vehicle. The controls may include controls that mimic those available within a traditional vehicle such as a steering wheel, acceleration pedal, and brake pedal. Alternatively, different forms of controls may be available at the teleoperator workstation 117 such as a joystick, mouse, touch screen, voice control system, gesture control system, or other input mechanism to control one or more aspects of the vehicle.

In other embodiments, where the remote support server 112 operates entirely as an artificial intelligence agent without human intervention, the teleoperator workstation 117 may be omitted.

In an embodiment, the remote operator controlling a vehicle 103, 114, 115, 116 via a remote support server 112 may be physically present near a vehicle 103, 114, 115, 116 and directly observe vehicle environment from the outside. Alternatively, a remote operator may be situated in an arbitrary location and observe vehicle environment via data feeds acquired by external sensor arrays 107. This mode of teleoperation is referred to herein as exocentric teleoperation.

In another embodiment, the remote operator controlling a vehicle 103, 114, 115, 116 via a remote support server 112 observes vehicle environment via data feeds acquired by sensor arrays that are at least in part on-board a vehicle 103, 114, 115, 116 being teleoperated. These sensors may be constructed to emulate at the teleoperator workstation 117, an approximation of the point of view normally possessed by a regular driver. This mode of teleoperation is referred to herein as egocentric teleoperation.

In a further embodiment, remote supports sessions of container yard vehicles 114, 115, 116 and visiting trucks 103 involve egocentric teleoperation by default with elements of exocentric teleoperation being utilized under certain circumstances, such as for hazardous operations such as container handling. Such a teleoperation mode combining features of both of the described modes is referred to herein as hybrid teleoperation.

A number of methods of preparing information for teleoperator perception may be employed. Some such methods may involve overlays of text, geometric shapes, highlights and other augmented reality elements onto video feeds received from cameras in the container yard 100 to provide an augmented reality view of a perspective of the truck that may generate HUDs (heads-up displays) on a display device at the teleoperator workstation 117. In an embodiment, the HUD of the teleoperator workstation 117 is implemented as a projection of auxiliary information on a monitor such as an LCD panel or a plurality thereof. Video feeds comprising a main teleoperator view may occupy the whole background of a monitor, while additional data such as virtual lane boundaries to follow, lines enveloping the expected vehicle position for a brief future time interval, reprsentations of objects in a vicinity of the vehicle, shipment manifests, additional exocentric camera feeds or the speed limit to observe may be rendered on top of the main teleoperator view. In another embodiment, the HUD of the teleoperator workstation 117 is implemented as a projection of auxiliary information on the screen of a virtual reality headset.

Figure 2:
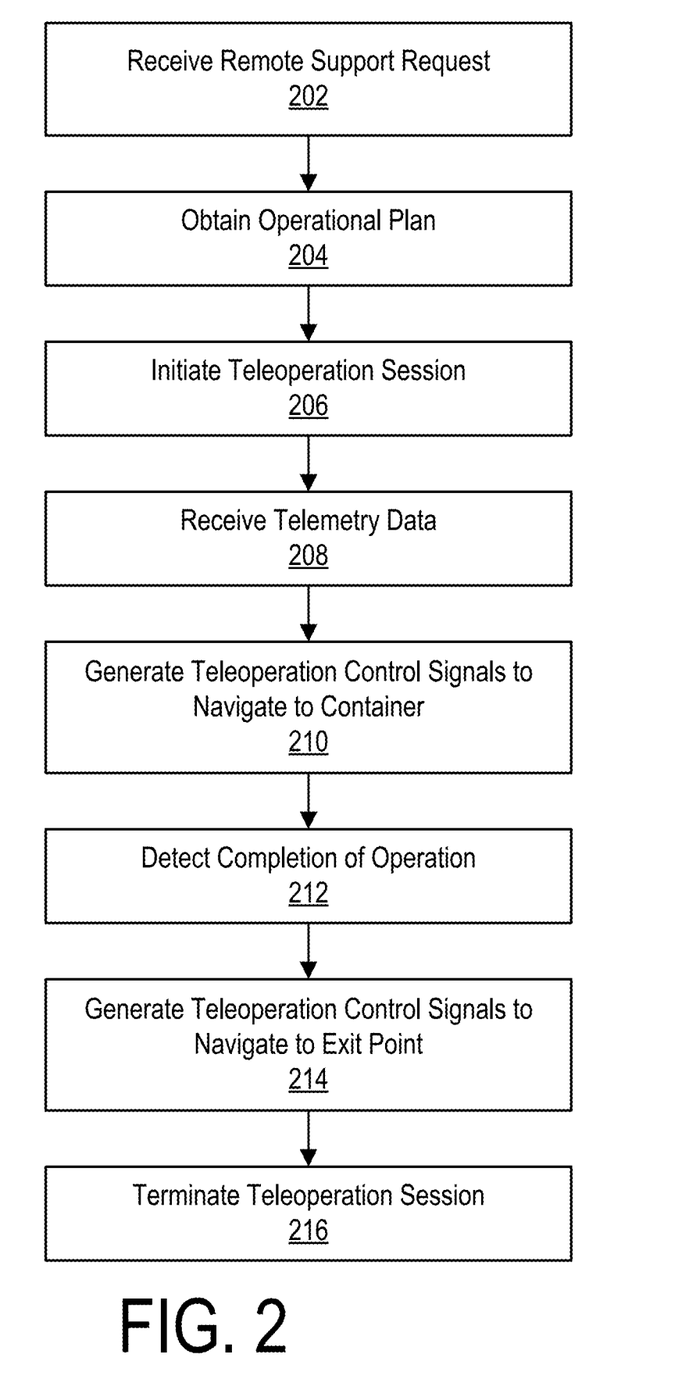
FIG. 2 is a flowchart illustrating a remote support session of a vehicle in accordance with an embodiment.

FIG. 2 is a flowchart illustrating a remote support session of a carrier truck 103 in accordance with an embodiment. The remote support server 112 receives 202 a remote support request. The remote support request may be initiated by a carrier truck 103, yard truck 115, forklift 114 or other vehicle. Alternatively, the remote support request may be initiated by an external device such as an on-site computer device or mobile device carried by a driver of a vehicle. In an embodiment, the remote support request may be requested by a carrier truck 103 responsive to initial conditions being met (for instance, a carrier truck 103 being at rest in the designated lot at an entry gate 110.

In response to the request, the remote support server 112 obtains 204 an operational plan associated with the vehicle making the remote support request (e.g., from the information system 113 or from a human operator) and initiates 206 a remote support session with the vehicle. The remote support 112 receives 208 telemetry data from the vehicle representing environmental conditions in a vicinity of the vehicle to enable teleoperation. The telemetry data may include one or more video feeds and other sensor data feeds from the vehicle or from distributed sensor arrays 107. The remote support server 112 generates 210 teleoperation control signals via a control channel to control navigation of the vehicle based on the telemetry data in accordance with the operational plan. For example, the remote support server 112 may cause the vehicle to navigate to a container stack 101 for a loading or unloading operation. The remote support server 112 may directly initiate a teleoperation session using an autonomous agent or the remote support server 112 may communicate with a human teleoperator workstation 117 to enable a human teleoperator to carry out the teleoperation session. The teleoperator (human or autonomous) subsequently receives guidance from the container yard information system 113 on the route, safety limits to follow and other information presented via a HUD embodiment, and maneuvers the carrier truck 103 to a destination waypoint in accordance with the operational plan. For example, in an embodiment, the teleoperator may receive a sequence of waypoints and operational tasks (such as loading or unloading) at or in between the waypoints. The remote support system 112 then generates teleoperation control signals that enable the vehicle to navigate through the waypoints and complete the tasks. The remote support server 112 detects 212 completion of a final operation (e.g., a loading or unloading operation in association with a container stack 101) and generates 214 teleoperation control signals (based on the telemetry data and operational plan) to navigate the vehicle to an end point (such as the exit gate 111). The remote support server 112 then terminates 216 the teleoperation session upon detecting that the vehicle reaches the end point. For example, the remote support server 112 may enable an in situ driver in a carrier truck 103 to regain control of the carrier truck 103.

Trailer Truck Driver Safety

In an example operating scenario, the driver of a carrier truck 103 and accompanying personnel abandon the carrier truck 103 in a designated staging area located at a sufficient distance from hazardous equipment and cargo, such as near the entry gate 110. Subsequently a remote support request is executed to allow a teleoperator to maneuver the carrier truck 103 in the container yard environment 100 beyond the limits of the staging area. The remote support request may be initiated by the driver, by a designated officer in a monitoring outpost attached to the staging area, or by other personnel such as a controller officer equipped with displays transmitting data feeds provided by sensor arrays 107 in the staging area near the entry gate 110, or a similarly equipped supervisor assigned by the transport company.

The teleoperator may subsequently maneuver the carrier truck 103 according to the information and guidance provided by the information system 113 for loading or unloading operations to be performed and to return to the staging area afterwards. Alternatively, in a container yard 100 with distinct and separated entry and exit gates 110, 111 the teleoperator may maneuver the truck to the designated drop off point such as an exit gate 111 instead after the container loading or unloading operations are complete.

In an embodiment, during the teleoperation session, the container yard information system 113 may transmit to the personal electronic device of the truck driver and accompanying personnel updates on the status of the carrier truck 103 they are associated with, and optionally directions to the staging area connected to an exit gate 111 where the truck driver and accompanying personnel may embark the carrier truck 103. Such updates and guidance may be provided by the container yard information system using a number of technical means.

In an embodiment, the information system 113 may issue to a truck driver, printouts containing the destination lot identifier, step-by-step walking directions, and a printout identifier such as a barcode, a QR code, or other type of machine-readable or human-readable information. The staging area associated with the exit gate 111 may partially comprise one or more devices or human agents collecting such printouts for recycling and for confirmation that a driver has arrived at the staging area safely.

In an embodiment, the staging areas associated with the entry and exit gates 110, 111 may partially comprise one or more devices allowing a truck driver to register departure and arrival at staging areas in the information system 113 using an RFID scan of a dedicated smart card, or a smartphone with an appropriate application installed.

In an embodiment, the staging areas associated with the entry and exit gates 110, 111 may partially comprise one or more devices allowing the information system 113 to register a driver's departure and arrival at staging areas as well a driver's position, heading and other relevant information using computer vision and face recognition methods and data feeds acquired by sensor arrays 107 installed at the staging areas.

In an embodiment, the information system 113 may partially comprise a mobile application running on a smartphone in a driver's possession and connected using cellular or WiFi wireless technology. The information system 113 may issue navigational instructions to a driver via the smartphone using methods such as push notifications, visual or audible instructions issued with the mobile application, messages sent via an instant messenger application, audible instructions issued in the duration of an ongoing voice call, SMS text messages or emails.

In an embodiment, the information system 113 may partially comprise a loudspeaker system, and issue announcements regarding carrier truck 103 status using the loudspeaker system in a fashion similar to flight status announcements for passengers in an airport.

In an embodiment, the information system 113 may partially comprise one or more devices located at the staging area at an entry gate 110 and automatically issue to arriving drivers a dedicated device possessing a visual display or audio output capabilities. The device may display an arrow indicating the current direction where the driver should be walking to safely reach the destination. The device may use the color of the arrow or its shape to provide visual cues on the necessary walking speed or any additional guidance directions such as requests to await security personnel. The device may complement the displayed information using voice commands or audible signals presented by the audio output system.

In an embodiment, the staging areas at entry and exit gates 110, 111 where a driver of a carrier truck 103 and accompanying personnel disembark and embark the carrier truck 103 may be connected with elevated walkways or underground pedestrian tunnels. Such a pedestrian tunnel or elevated walkway connecting an entry gate $G_i$ and an exit gate $H_j$ may optionally be equipped with a travelator of length L running at speed V. The speed V may be chosen so that the travel time $T=L/V \in [\bar{t}_n-dt; \bar{t}_n+dt]$ where $\bar{t}_n$ is the mean interval between truck departure from the staging area at the entry gate 110 $G_i$ and arrival to the staging area at the exit gate 111 $H_j$ computed over either the last n registered trips or over the last n minutes, or based on any other considerations.

In an embodiment, a driver of a carrier truck 103 and any accompanying personnel may be transported between staging areas attached to gates 110, 111 by autonomous ground vehicles. For instance, a multi-passenger monorail cabin may run on a schedule determined based on considerations presented above for the method of computing travelator (moving walkway) speed and transport passengers between designated stations at the staging areas. Alternatively, a single-passenger vehicle may transport a driver directly between staging areas. The speed of such a single-passenger vehicle may be chosen to reflect the turnaround time of a specific carrier truck 103 and adjusted depending on the congestion of the road connecting the staging areas in order to prevent the driver awaiting their carrier truck 103 from loitering in a potentially dangerous area.

Aerial Drones

In a further embodiment, unmanned aerial vehicles such as multicopter drones 116 may accompany vehicles 103, 114, 115 in a container yard 100 by flying overhead or maintaining a relative position. An aerial drone 116 may act as a wireless signal retransmitter if local cellular, WiFi or similar wireless access points are not available or cannot be safely utilized, and communications with a remote wireless transmitter 109 such as a cellular or microwave tower are blocked or degraded by obstacles such as container stacks 101. The container yard information system 113 may provide information to an aerial drone 116, which may subsequently compute and follow a trajectory. Alternatively, an aerial drone 116 may track and follow the current position of the accompanied vehicle 103, 114, 115, or initiate a remote support request to start a teleoperation session.

Figure 3:
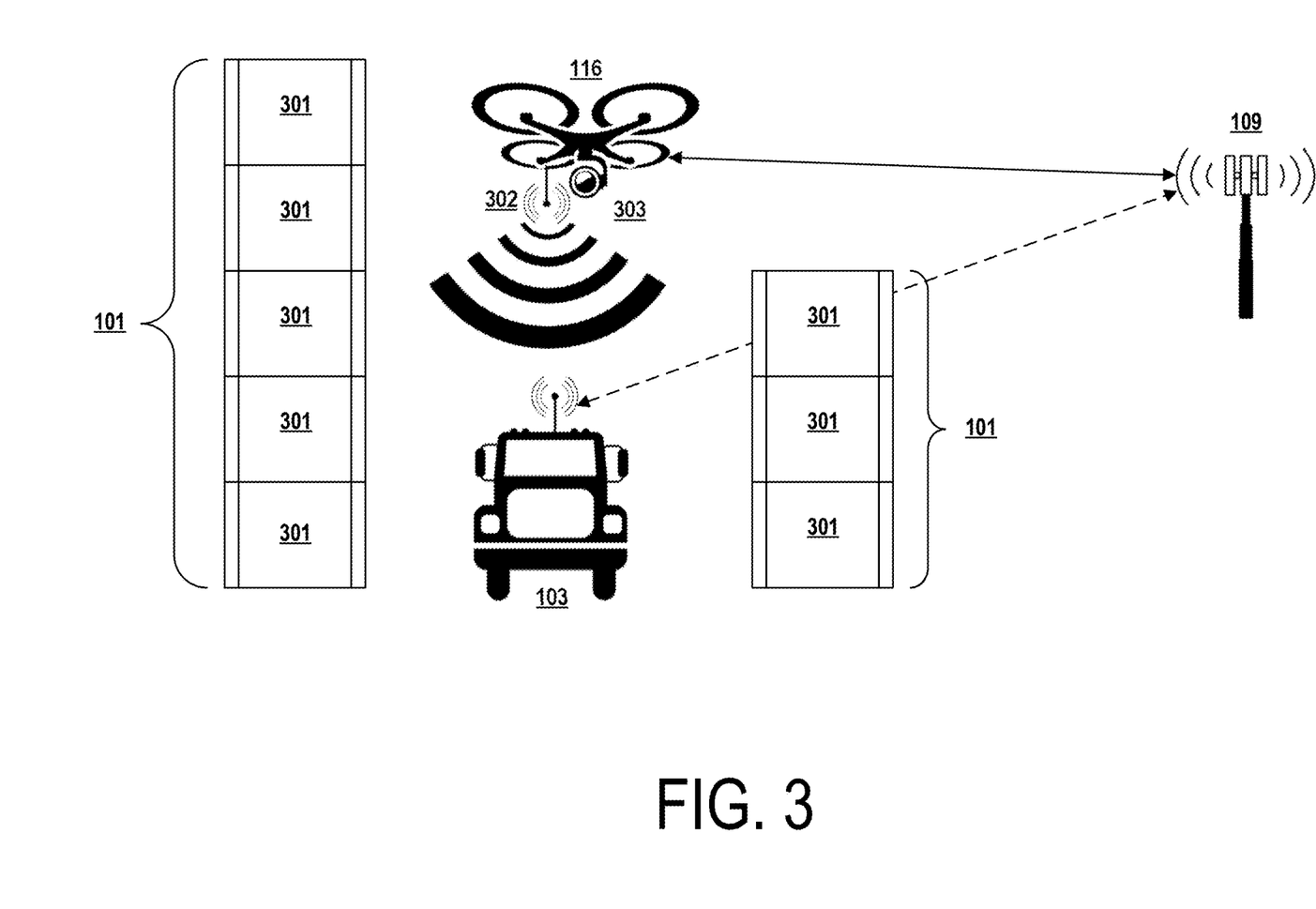
FIG. 3 illustrates an overhead aerial drone operating in accordance with an embodiment.

FIG. 3 illustrates an aerial drone 116 operating in accordance with an embodiment. In an embodiment, the remote support server 112 transmits a deployment signal to deploy one or more aerial drones 116 when initiating a teleoperation session to maintain an overhead position relative to a teleoperated vehicle and operate as a wireless signal re-transmitter for communications between the remote support server 112 and the vehicle. For example, a multirotor aircraft 116 equipped with cellular signal retransmission hardware 302 and a sensor array 303 maintains altitude above stacks 101 of containers 301 sufficient to directly communicate with a remote wireless transmitter 109. The aerial drone 116 subsequently acts as an intermediate between the wireless transmitter 109 and a teleoperated truck 103 or other ground vehicle which has its own communications capability obstructed by a container stack 101. Thus, when generating the teleoperation control signal, the remote support server 112 transmits the signals to the aerial drone 116, which relays the signals to the vehicle. Similarly, the vehicle may transmit telemetry data to the aerial drone 116, which relays the signals to the remote support server 112. In another embodiment, a plurality of aerial vehicles may be deployed to fly in a formation relative to a position of a teleoperated vehicle to operate as a chain of wireless signal re-transmitters between the remote support server 112 and the vehicle.

In a further embodiment, an aerial drone 116 may partially comprise an autonomous circuit for controlling altitude and attitude to minimize impact on wireless signal retransmission capabilities. For instance, a drone 116 may increase its flight altitude from a base level when passing a high container stack 101 that may partially block the wireless communication channel to a remote wireless transmitter 109, and decrease its altitude back to a base level after the obstacle is no longer a threat to affect communication quality, as well as adjust signal strength appropriately.

In a further embodiment, an aerial drone 116 may partially comprise a MIMO or massive MIMO antenna technology array, and synchronize transmissions in multiple directions that utilize reflections of radio signals from surrounding containers 301 to amplify the quality of wireless communication channel with a teleoperated carrier truck 103 or other ground vehicle.

In a further embodiment, an aerial drone 116 may partially comprise a platform possessing one or more rotational degrees of freedom on which the radio equipment 302 is mounted. An aerial drone 116 may subsequently align the platform to promote efficient communications with remote wireless transmitters 109 responsive to information on position, altitude and attitude collected via any number of available means such as stereo vision, sonar or laser altimeters, computer vision techniques, GPS sensors and IMUS, as well as wireless tower triangulation.

In an embodiment, an aerial drone 116 may partially comprise a sensor array 303, and provide an auxiliary top-down exocentric video feed or other telemetry data to the remote support server 112 operating as a teleoperator controlling a ground vehicle 103, 114, 115 automatically or responsive to a request. Here, the teleoperation control signals may be based at least in part on the auxiliary telemetry data from the aerial drone 116.

In a further embodiment, an aerial drone 116 may safely park in a designated location to conserve battery power responsive to a signal from the information system 113 that a loading or unloading operation of a container 301 has been initiated. Alternatively, an aerial drone 116 may provide an auxiliary exocentric video feed to a teleoperator controlling a transfer crane 102, as well as an optional set of controls to manipulate the sensor array 303.

In an embodiment, the container yard information system 113 may automatically choose an aerial drone 116 possessing sufficient battery power level available to associate with a ground vehicle 103, 114, 115 requesting remote support responsive to available information such as an estimate of the time for the remote support session. In case a qualifying aerial drone 116 cannot be identified, its functions may be sequentially fulfilled by a plurality of aerial drones 116 each possessing battery power level only partially sufficient for the estimated time of the remote support session. For example, responsive to the container yard information system 113 determining that at a certain point of time, a first deployed aerial drone 116 will exhaust its available battery power to a degree that will only allow it to return safely to the docking station with the desired safety margin, the information system 113 may instruct another aerial drone 116 to take off and function as a replacement of the first one. The container yard information system 113 may also account for the estimated time for a teleoperator to execute the remote support request if an aerial drone 116 is teleoperated rather than autonomous. Furthermore, the remote support server 112 may detect a power level of a deployed aerial drone 116 supporting a vehicle through a first phase of an operation plan, and deploy a replacement drone 116 responsive to the power level dropping below a threshold level to enable the replacement drone 116 to support the vehicle through a second phase of the operational plan.

In a further embodiment, if a first deployed aerial drone 116 associated with a teleoperated vehicle 103 has poor connectivity to a wireless signal transmitter 109, the container yard information system 113 may instruct a second aerial drone 116 to maintain a position and attitude suitable for functioning as an intermediate retransmitter between the wireless signal transmitter 109 and the first aerial drone 116.

In an embodiment, an aerial drone 116 may partially comprise an internal combustion engine instead of electric batteries and power cells. In this case, the above-described considerations relating to battery power levels may instead be implemented in relation to fuel levels of the aerial drone 116.

Yard Trucks

Another utility vehicle type commonly in container yards are yard trucks 115. Trucks of this type are usually confined to the limits of the container yard 100, and are used for containership discharging and loading operations. Yard trucks 115 can either be engaged in single-cycle operations, i.e., alternating between loaded and empty travel segments, or dual-cycle operations, i.e., traveling loaded in either direction to and from the berth. Employing dual-cycle operations may considerably reduce the total duration of empty travels.

In an embodiment, the remote support server 112 may provide teleoperation control over a yard truck 115 using any of the techniques described above. For example, the remote support server 112 may receive a signal indicating that a container is ready to be loaded or unloaded and initiate a remote support session for a yard truck 115 to enable teleoperation of the yard truck 115 for the loading or unloading operation.

In an embodiment, a yard truck 115 may partially comprise a sensor array, computing and network devices and drive-by-wire interfaces, and support teleoperated functioning in a manner previously described. Such an approach permits the removal of human drivers from the potentially hazardous areas of a container yard 100.

In a further embodiment, the information system 113 may associate a yard truck 115 with a plurality of quay cranes 105 to allow dual-cycle operations. For instance, the information system 113 may associate a yard truck 115 with a first quay crane 105 engaged in containership 106 unloading operations and a second quay crane 105 engaged in containership 106 loading operations. The information system 113 may run a travel cost minimization algorithm to determine the order in which a yard truck 115 may visit the quay cranes 105 as well as the specific mapping of a plurality of yard trucks 115 to a plurality of quay cranes 105.

Figure 4A:
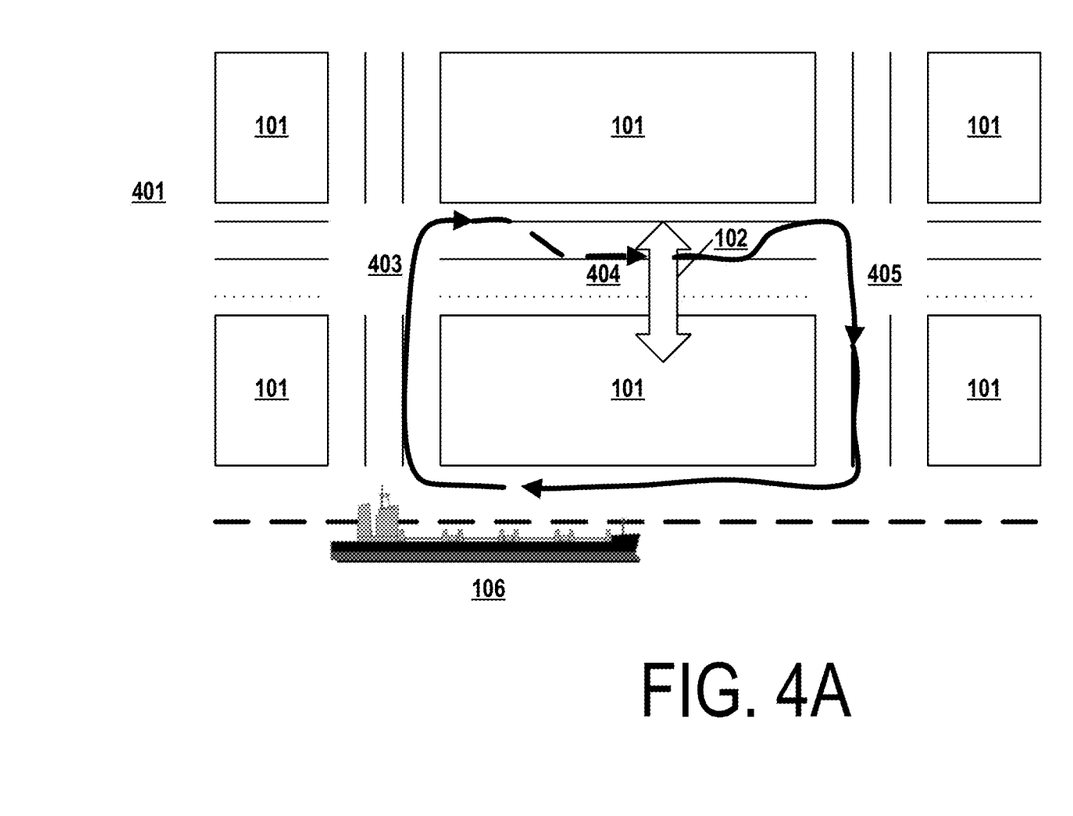
FIG. 4A illustrates a unidirectional yard track operating in accordance with an embodiment.
Figure 4B:
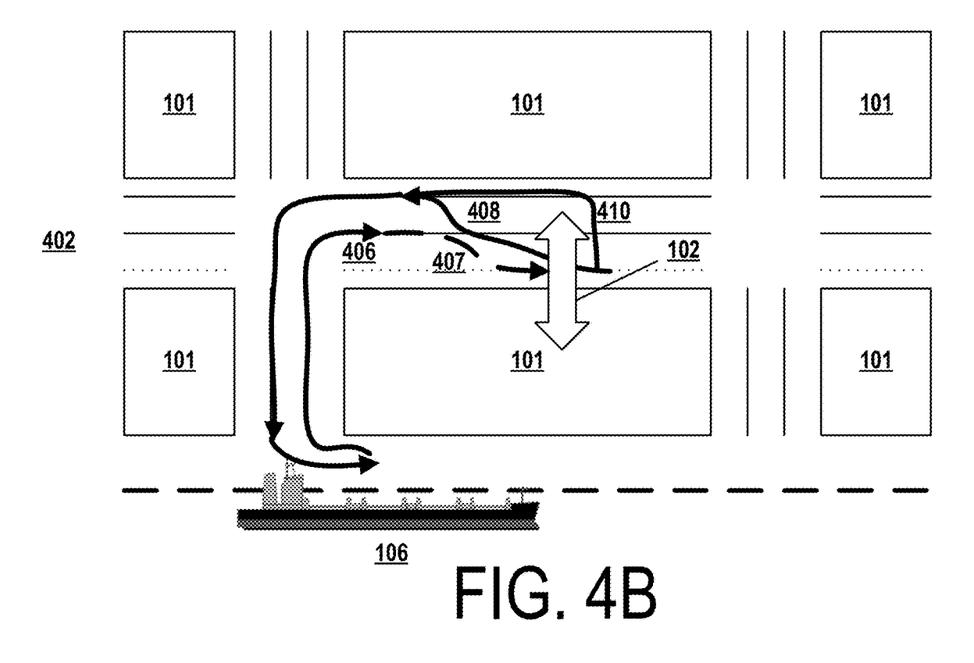
FIG. 4B illustrates a bi-directional yard truck operating in accordance with an embodiment.

In an embodiment, a yard truck 115 may comprise a symmetrically designed autonomous or teleoperated container platform supporting bi-directional travel. Such a yard truck 115 may avoid being directed to loop around blocks of container stacks 101, and may be able to steer into an oncoming traffic lane immediately after a loading or unloading operation has been completed due to an absence of a preferred travel direction, as well as possess a reduced footprint. FIG. 4A illustrates a top-down view of an operational map 401 representing a trajectory of a unidirectionally operated yard truck 115 through an example container yard 100. FIG. 4B illustrates a top-down view of an operational map 402 representing a trajectory of a bi-directional yard truck 115 through an example container yard 100. The unidirectionally operated yard truck 115 drives along a trajectory 403 from a source point such as a containership 106 being unloaded to a destination stack 101; moves along a trajectory 404 to the appropriate lane serviced by a transfer crane 102; moves to a regular lane and loops following a trajectory 405 around a block of container stacks 101 to return to the containership 106 for further operations. In contrast, a bi-directionally operated yard truck 115 drives along a trajectory 406 from the source point such as a containership 106 being unloaded to a destination stack 101; moves along a trajectory 407 to the appropriate lane serviced by a transfer crane 102; and then reverses its travel direction and moves to the opposite lane along a trajectory 408, thus potentially reducing the duration of empty travel.

Figure 4C:
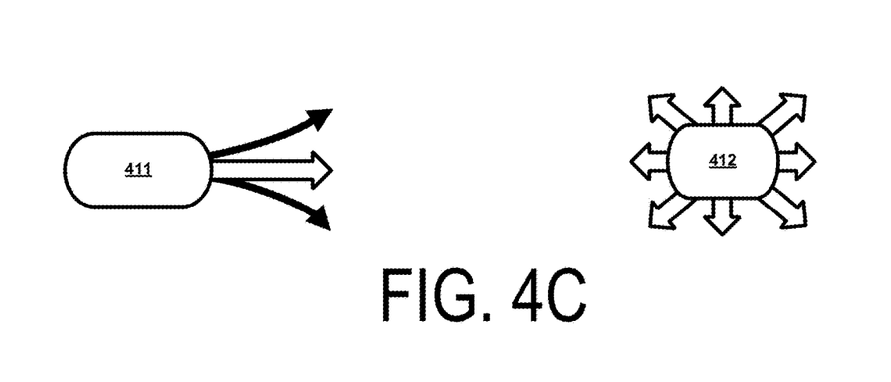
FIG. 4C illustrates trajectories of a yard truck with conventional or omnidirectional wheels.

In a further embodiment, a yard truck 115 may partially comprise a plurality of omnidirectional mecanum wheels or similar implements to facilitate a faster transfer to the oncoming traffic lane by driving laterally into the lane. Such a yard truck 115 may use a trajectory 410 in which it drives laterally into the return lane instead of trajectory 408 in which it drives forward into the return lane for its empty travel. In a further embodiment, a yard truck 115 may align itself with a container 301 currently being processed with a transfer crane 102 or a quay crane 103 to improve container loading accuracy and speed. FIG. 4C illustrates maneuverability options of a yard truck 411 with standard wheels and maneuverability options of an omnidirectional yard truck 412 with omnidirectional wheels such as mechanum wheels 403.

Forklifts

A container yard 100 may possess a dedicated warehouse area for loading shipments into containers. Such an area may be located adjacent to the container yard 100 or at some degree of separation from.

In an embodiment, the remote support server 112 may provide teleoperation control over a forklift 114 using any of the techniques described above. For example, the remote support server 112 may receive a signal indicating that a container is ready to be loaded or unloaded and initiate a remote support session for a forklift 114 to enable teleoperation of the forklift 114 for the loading or unloading operation. In an embodiment, a forklift 114 may partially comprise a sensor array, computing and network devices and drive-by-wire interfaces, and support teleoperated functioning in a manner previously described. Such an approach permits the removal of human drivers from the potentially hazardous areas of a container yard 100.

In an embodiment, a forklift 114 may partially comprise a scale and a counterweight. Responsive to a forklift 114 starting to lift a pallet, an onboard computer calculates the change of a counterweight position necessary to balance the pallet and to maintain the center of mass of the forklift 114 and cargo system in the desired location if possible, or notify the teleoperator of the forklift 114 or in situ personnel otherwise.

In an embodiment, a forklift 114 may partially comprise an extensible antenna, allowing it to retain an acceptable connection quality to a remote wireless transmitter 109 or an aerial drone 116 when driving into a container to process a pallet. The forklift 114 may comprise a detachable communication device that can be automatically mounted at an entrance to the container 101.

In an embodiment, a forklift 114 may be equipped to provide a fully reversible driving experience to a teleoperator. For instance, a forklift 114 may partially comprise rear-view cameras installed at the same altitude as the fore cameras, and provide input normalization to teleoperator commands to emulate a regular steering experience with the effectively opposite-wheel steering setup available when in the reverse driving mode.

In an embodiment, a forklift 114 may partially comprise an array of ranging sensors such as sonars, and provide audible notifications for the teleoperator or an enhanced telemetry stream for the machine intelligence agent allowing to safely maneuver in tight spaces.

In a further embodiment, a forklift 114 may partially comprise a local computing circuit integrated with the ranging sensor array preventing a remote operator from executing operations that are estimated to lead to a collision of the forklift or the pallet with a container, cargo, or any other obstacles.

Path Homotopies

Safety management of a smart container yard 100 may be a challenging task. Multiple manned, autonomous and tele-operated vehicles, as well aerial drones, containers in transfer and crane arms create a complex three-dimensional interplay that must be managed in a manner as to prevent collisions. To reduce the costs of supervision required to achieve an acceptable level of safety, a number of automation techniques may be employed.

In an embodiment the container yard information system 113 may utilize a distributed array 107 of sensors such as stereo cameras, ranging devices such as sonars, LIDARs, or radars, BLE beacons, NFC tags and other implements to maintain a representation of the current state of the container yard 100 with the required degree of precision and completeness. The container yard information system 113 may generate a space state representing physical objects in the container yard 100 and generate an operational plan based on the space state to include navigation paths that avoid physical obejcts. For example, responsive to the data acquired from the sensor arrays 107, the information system 113 subsequently builds and maintains a representation of the container yard 100 space as a cuboid populated by polygonal shapes enveloping physical objects in the container yard 100, further referred to as obstacles $\Omega$. The information system 113 subsequently performs a 3D constrained Delaunay triangulation of vertices of obstacles $v_i$ in the yard, which also includes edges of obstacles $\epsilon_i$ as a part of the triangulation based on this representation of the space of the container yard. 3D Delaunay triangulations possess the empty sphere property, i.e. the circumscribing sphere of each cell produced by triangulation process contains no other vertices of the triangulation in its interior. It is recognized that choices for safe paths that may be taken by a ground or an aerial vehicle may be represented by a limited set of options, each containing an infinite number of homotopic paths (i.e. continuously deformable curves) identified by sequences of merged Delaunay cells, with each subsequent cell sharing a single face with the previous one in the sequence. This allows the information system 113 to split the navigation task into two subtasks: selection of the homotopy to use and executing maneuvers to stay within the chosen homotopy and reach the destination.

Figure 5:
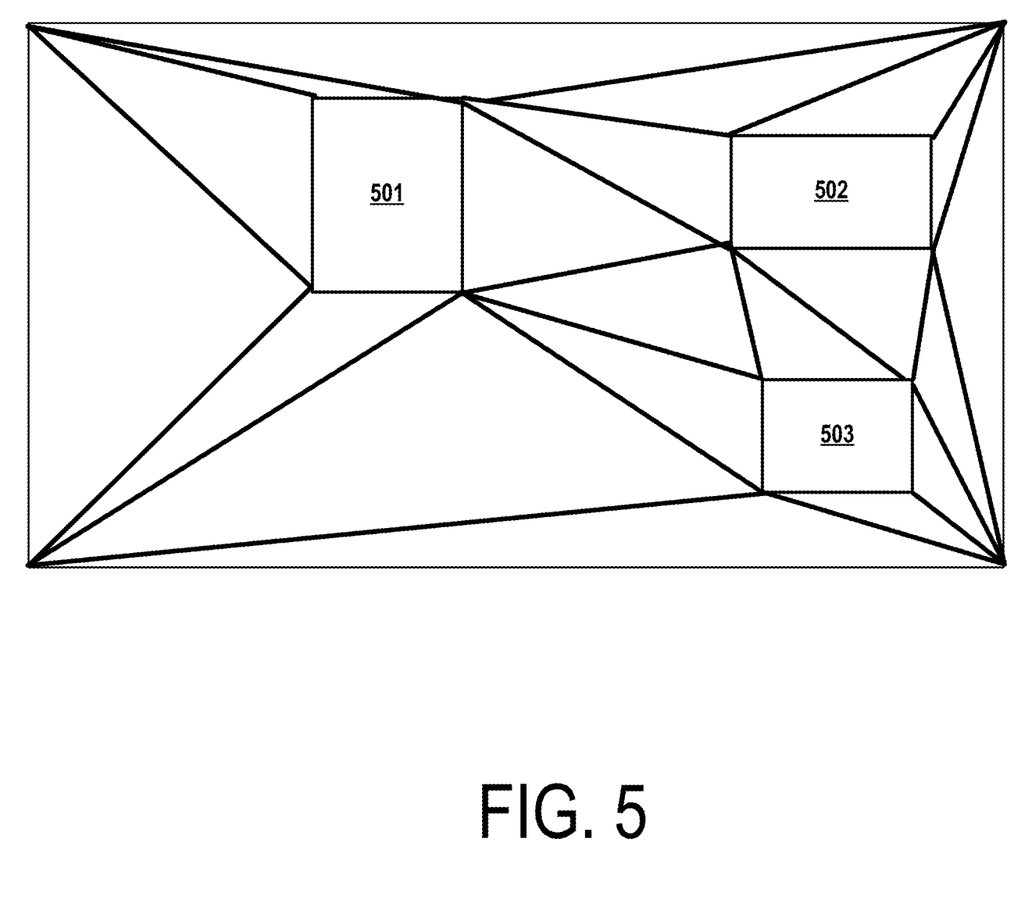
FIG. 5 is a diagram illustrating an example two-dimensional Delaunay triangulation in accordance with an embodiment.

In an embodiment, the information system 113 may identify path homotopies in a 2D configuration space decomposed into a complex of constrained Delaunay triangles, and apply additional constraints based on vehicle kinematics and height during the second stage of navigation. Responsive to the secondary analysis showing that a homotopy chosen during the first stage cannot be safely used due to factors such as collision with an aerial obstacle, the information system 113 chooses the next option in the list of homotopies sorted by descending optimality. FIG. 5 illustrates an example of a constrained 2D Delaunay triangulation, where 501, 502 and 503 are obstacle envelopes.

In an embodiment, the onboard computing system of a utility vehicle such as a forklift 114 or a container handler may sequentially transmit updates on forklift or spreader extension level to the container yard information system 113. This information may then be used to update the dynamic 3D obstacle map and path planning of other vehicles and drones.

In an embodiment, the onboard computing system of a utility vehicle such as a forklift 114 or a container handler may transmit the commencement timestamp of extension or other operations changing the shape of a utility vehicle and metadata describing the process such as extension speed and the expected extension length to the container yard information system 113. The container yard information system 113 may subsequently extrapolate the updated shape of the vehicle responsive to the information received.

In an embodiment, the container yard information system 113 acquires information necessary to update dynamic obstacle map on positions and shapes of obstacles such as forklifts 114, yard trucks 115, aerial drones 116, wireless transmitters 109 and cranes 102, 103 from sensor arrays 107 such as optical or infrared camera arrays and computer vision techniques, or ranging sensors such as LIDARs, sonars or radars.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, the use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

The invention claimed is:

1. A method for managing a teleoperated vehicle in a container yard, the method comprising:
   receiving, at a remote support server, a remote support request associated with a truck at an entry point of the container yard;
   in response to receiving the remote support request, obtaining an operational plan for the truck from a container yard information system and initiating a teleoperation session for the truck;
   determining an identifier of a container to be loaded or unloaded by the truck in the container yard as part of the operational plan;
   determining based on the identifier of the container, dynamical properties of the container that affect control parameters for safely operating the truck through the container yard during the teleoperation session;
   during the teleoperation session, receiving a telemetry data stream representing environmental conditions in a vicinity of the truck to enable teleoperation of the truck in accordance with the operational plan; and
   generating, based on the operational plan, the dynamical properties of the container being carried by the truck, and the telemetry data stream, teleoperation control signals for controlling the truck to navigate through the container yard to carry out an operation in accordance with the operational plan; and
   responsive to detecting the truck reaching an exit point of the container yard, terminating the teleoperation session.

2. The method of claim 1, wherein generating the teleoperator control signals is further based on sensor data received from distributed sensor arrays in the container yard.

3. The method of claim 1, further comprising:
   identifying a personal electronic device of a driver associated with the truck; and
   transmitting to the personal electronic device of the driver during the teleoperation session, directions to the exit point of the container yard.

4. The method of claim 1,
   wherein initiating the teleoperation session comprises transmitting a deployment signal to deploy an aerial vehicle to maintain an overhead position relative to the truck to enable the aerial vehicle to operate as a wireless signal re-transmitter for communications between the remote support server and the truck when carrying out the operational plan;

wherein generating the teleoperation control signals comprises transmitting the teleoperation control signals to the aerial vehicle; and wherein receiving the telemetry data stream comprises receiving the telemetry data stream from the aerial vehicle.

5. The method of claim 4, further comprising:

receiving, at the remote support server, an auxiliary telemetry data stream comprising telemetry data captured by sensors of the aerial vehicle; and wherein generating the teleoperation control signals for controlling the truck is further based at least in part on the auxiliary telemetry data stream from the aerial vehicle.

6. The method of claim 1, wherein initiating the teleoperation session comprises transmitting a deployment signal to deploy a plurality of aerial vehicles to fly in a formation at a position relative to the truck to enable the plurality of aerial vehicles to operate as a chain of wireless signal re-transmitters for communications between the remote support server and the truck when carrying out the operational plan;

wherein generating the teleoperation control signals comprises transmitting the teleoperation control signals via the plurality of aerial vehicles; and wherein receiving the telemetry data stream comprises receiving the telemetry data stream via the plurality of aerial vehicles.

7. The method of claim 1, wherein initiating the teleoperation session comprises transmitting a deployment signal to deploy a first aerial vehicle to maintain an overhead position relative to the truck to enable the first aerial vehicle to operate as a wireless signal re-transmitter for communications between the remote support server and the truck when carrying out a first phase of the operational plan;

detecting a power level of the first aerial vehicle; and responsive to the power level dropping below a threshold power level when carrying out the operational plan, sending a deployment signal to deploy a replacement aerial vehicle to maintain the overhead position relative to the truck to enable the replacement aerial vehicle to operate as the wireless signal re-transmitter for communications between the remote support server and the truck when carrying out a second phase of the operational plan.

8. The method of claim 1, wherein obtaining the operational plan comprises:

generating a container yard space state representing physical objects in the container yard; and generating the operational plan based on the container yard space state to include navigation paths that avoid the physical objects.

9. The method of claim 8, wherein generating the operational plan based on the container yard space state to include the navigation paths that avoid the physical objects comprises:

identifying path homotopies based on a triangulation of paths between the physical objects.

10. The method of claim 1, wherein obtaining the operational plan comprises:

determining an identifier of the truck at the entry point; and performing a lookup of the identifier in a vehicle database to obtain the operational plan for the truck.

11. The method of claim 1, wherein generating the teleoperation control signals comprises:

generating an augmented reality view of a perspective of the truck based on the telemetry data stream, the augmented reality view including a video from one or more cameras of the truck overlaid with information representing data from the telemetry data stream relevant to an environment of the truck;

outputting the augmented reality view to a display headset of an operator; and obtaining the teleoperation control signals based on inputs received from the operator using one or more input controllers.

12. The method of claim 11, wherein the augmented reality view includes a representation of information from the container yard information system describing physical objects in a vicinity of the truck.

13. The method of claim 1, further comprising:

receiving a signal that the container is ready to be loaded or unloaded; and responsive to the signal, initiating a remote support session for a forklift having an extensible antenna to allow wireless connectivity when the forklift enters the container; and teleoperating the forklift to perform the loading or unloading of the container.

14. The method of claim 13, wherein the forklift further comprises a detachable communications device that can be automatically mounted at an entrance to the container;

wherein generating the teleoperation control signals comprises transmitting the teleoperation control signals to the detachable communications device; and wherein receiving the telemetry data stream comprises receiving the telemetry data stream from the detachable communications device.

15. The method of claim 1, further comprising:

receiving a signal that the container is ready to be loaded or unloaded; and responsive to the signal, initiating a remote support session for a yard truck; and teleoperating the yard truck to perform the loading or unloading of the container.

16. A non-transitory computer-readable storage medium storing instructions for managing a teleoperated vehicle in a container yard, the instructions when executed by a processor causing the processor to perform steps comprising:

receiving, at a remote support server, a remote support request associated with a truck at an entry point of the container yard;

in response to receiving the remote support request, obtaining an operational plan for the truck from a container yard information system and initiating a teleoperation session for the truck;

determining an identifier of a container to be loaded or unloaded by the truck in the container yard as part of the operational plan;

determining based on the identifier of the container, dynamical properties of the container that affect control parameters for safely operating the truck through the container yard during the teleoperation session;

during the teleoperation session, receiving a telemetry data stream representing environmental conditions in a vicinity of the truck to enable teleoperation of the truck in accordance with the operational plan; and generating, based on the operational plan, the dynamical properties of the container being carried by the truck, and the telemetry data stream, teleoperation control signals for controlling the truck to navigate through the container yard to carry out an operation in accordance with the operational plan; and responsive to detecting the truck reaching an exit point of the container yard, terminating the teleoperation session.

17. The non-transitory computer-readable storage medium of claim 16,
wherein initiating the teleoperation session comprises transmitting a deployment signal to deploy an aerial vehicle to maintain an overhead position relative to the truck to enable the aerial vehicle to operate as a wireless signal re-transmitter for communications between the remote support server and the truck when carrying out the operational plan;

wherein generating the teleoperation control signals comprises transmitting the teleoperation control signals to the aerial vehicle; and wherein receiving the telemetry data stream comprises receiving the telemetry data stream from the aerial vehicle.

18. The non-transitory computer-readable storage medium of claim 16, wherein generating the teleoperation control signals comprises:
generating an augmented reality view of a perspective of the truck based on the telemetry data stream, the augmented reality view including a video from one or more cameras of the truck overlaid with information representing data from the telemetry data stream relevant to an environment of the truck;

outputting the augmented reality view to a display headset of an operator; and obtaining the teleoperation control signals based on inputs received from the operator using one or more input controllers.

19. A remote support server for managing a teleoperated vehicle in a container yard, the remote support server comprising:
one or more processors; and
a non-transitory computer-readable storage medium storing instructions that when executed cause the one or more processor to perform steps comprising:
receiving, at a remote support server, a remote support request associated with a truck at an entry point of the container yard;

in response to receiving the remote support request, obtaining an operational plan for the truck from a container yard information system and initiating a teleoperation session for the truck;

determining an identifier of a container to be loaded or unloaded by the truck in the container yard as part of the operational plan;

determining based on the identifier of the container, dynamical properties of the container that affect control parameters for safely operating the truck through the container yard during the teleoperation session;

during the teleoperation session, receiving a telemetry data stream representing environmental conditions in a vicinity of the truck to enable teleoperation of the truck in accordance with the operational plan; and generating, based on the operational plan, the dynamical properties of the container being carried by the truck, and the telemetry data stream, teleoperation control signals for controlling the truck to navigate through the container yard to carry out an operation in accordance with the operational plan; and responsive to detecting the truck reaching an exit point of the container yard, terminating the teleoperation session.

20. The remote support server of claim 19,
wherein initiating the teleoperation session comprises transmitting a deployment signal to deploy an aerial vehicle to maintain an overhead position relative to the truck to enable the aerial vehicle to operate as a wireless signal re-transmitter for communications between the remote support server and the truck when carrying out the operational plan;

wherein generating the teleoperation control signals comprises transmitting the teleoperation control signals to the aerial vehicle; and wherein receiving the telemetry data stream comprises receiving the telemetry data stream from the aerial vehicle.

* * * * *